US012768436B2

(12) United States Patent
Koda et al.

(10) Patent No.: US 12,768,436 B2
(45) Date of Patent: Oct. 20, 2026

(54) POWER TRANSMISSION MECHANISM, DRIVE SYSTEM, AND OUTPUT UNIT

(71) Applicant: Sony Interactive Entertainment Inc., Tokyo (JP)

(72) Inventors: Yuta Koda, Kanagawa (JP); Hiroshi Osawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 19/083,746

(22) Filed: Mar. 19, 2025

(65) Prior Publication Data

US 2025/0314292 A1 Oct. 9, 2025

(30) Foreign Application Priority Data

Apr. 9, 2024 (JP) ................................ 2024-062974

(51) Int. Cl.
*F16H 55/36* (2006.01)
*F16H 55/17* (2006.01)

(52) U.S. Cl.
CPC ........... *F16H 55/36* (2013.01); *F16H 55/171* (2013.01); *F16H 2055/366* (2013.01)

(58) Field of Classification Search
CPC ........ F16H 55/36; F16H 55/46; F16H 55/171; F16H 2055/366; F16H 55/18; F16H 2057/127
See application file for complete search history.

(56) References Cited

U.S. PATENT DOCUMENTS 11,613,028 B2 * 3/2023 Fukamachi ............. F16H 3/145 74/89.13
12,259,033 B2 * 3/2025 Koda ........................ F16H 1/06

FOREIGN PATENT DOCUMENTS

| | | | | | | |
|---|---|---|---|---|---|---|
| CN | 106514646 | B | * | 11/2018 | .............. | B25J 17/02 |
| IT | 202000009295 | A1 | * | 10/2021 | ............. | F16H 55/36 |
| JP | 2005066810 | A | * | 3/2005 | | |
| JP | 2007205379 | A | | 8/2007 | | |
| JP | 2020196091 | A | | 12/2020 | | |
| JP | 2022147956 | A | | 10/2022 | | |
| JP | 2023059235 | A | | 4/2023 | | |
| WO | WO-2023167075 | A1 | * | 9/2023 | .............. | B25J 17/00 |

OTHER PUBLICATIONS

Search results produced from an examiner-submitted STIC search request (Year: 2026).*
Application No. JP2024-062974 , Office Action, Mailed on Mar. 31, 2026, 13 pages.

* cited by examiner

*Primary Examiner* — Bobby Rushing, Jr.
(74) *Attorney, Agent, or Firm* — Kilpatrick Townsend & Stockton LLP

(57) ABSTRACT

There is provided a power transmission mechanism including a drive unit that includes a power source, and an output unit driven by power from the power source, in which the output unit includes an output shaft, and an elastic member including a power-side end part that rotates according to the power from the power source, an output-side end part that rotates in keeping with rotation of the power-side end part so as to rotate the output shaft, and an extension/contraction part that generates elastic force around a rotation center of the power-side end part and the output-side end part.

20 Claims, 7 Drawing Sheets

POWER TRANSMISSION MECHANISM, DRIVE SYSTEM, AND OUTPUT UNIT

CROSS REFERENCE TO RELATED APPLICATION

This application claims the benefit of Japanese Priority Patent Application JP 2024-062974 filed Apr. 9, 2024, the disclosure of which is incorporated herein by reference in their entirety for all purposes.

BACKGROUND

The present disclosure relates to a power transmission mechanism, a drive system, and an output unit.

Japanese Patent Laid-open No. 2023-59235 discloses what is known as the series elastic actuator (SEA) that uses an elastic element.

SUMMARY

The inventors of this application look to implement a power transmission mechanism that is simply configured and uses an elastic element.

It is desirable to provide a power transmission mechanism that is simply configured and uses an elastic element, a drive system, and an output unit.

According to an embodiment of the present disclosure, there is provided a power transmission mechanism that has a drive unit including a power source, and an output unit driven by power from the power source. The output unit includes an output shaft, and an elastic member including a power-side end part that rotates according to the power from the power source, an output-side end part that rotates in keeping with the rotation of the power-side end part so as to rotate the output shaft, and an extension/contraction part that generates elastic force around a rotation center of the power-side end part and the output-side end part.

According to an embodiment of the present disclosure, there is a drive system including a power transmission mechanism including a drive unit that includes a power source, and an output unit driven by power from the power source, the output unit including an output shaft, and an elastic member including a power-side end part that rotates according to the power from the power source, an output-side end part that rotates in keeping with the rotation of the power-side end part so as to rotate the output shaft, and an extension/contraction part that generates elastic force around a rotation center of the power-side end part and the output-side end part, and a torque calculation apparatus configured to calculate load torque on the output shaft on a basis of an extension/contraction amount of the elastic member according to a rotation angle of a drive shaft possessed by the drive unit and a rotation angle of the output shaft.

According to an embodiment of the present disclosure, there is an output unit driven by power from a power source, the including an output shaft, and an elastic member including a power-side end part that rotates according to the power from the power source, an output-side end part that rotates in keeping with rotation of the power-side end part so as to rotate the output shaft, and an extension/contraction part that generates elastic force around a rotation center of the power-side end part and the output-side end part.

DETAILED DESCRIPTION OF THE PREFERRED EMBODIMENT

A drive system S according to an embodiment of the present disclosure is described below with reference to the accompanying drawings.

Overview of the Overall Configuration of the Drive System S

Figure 1:
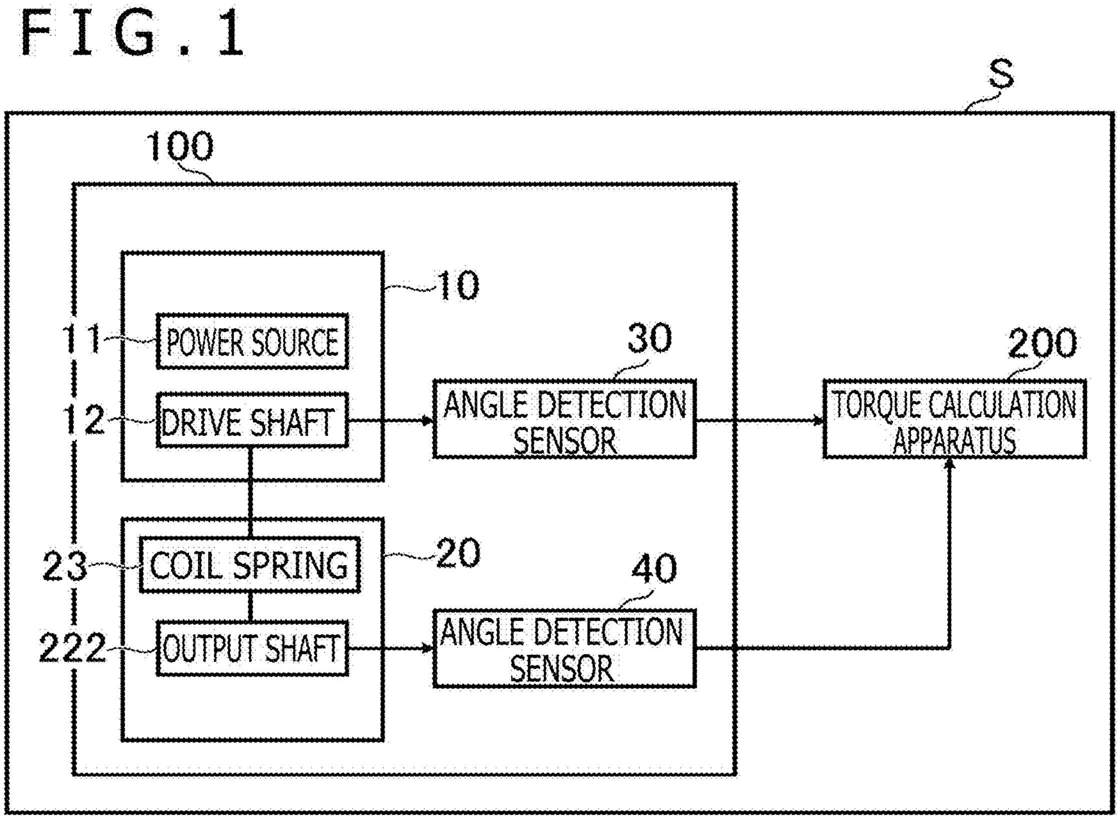
FIG. 1 is a block diagram outlining an overall configuration of a drive system, according to various embodiments of the present disclosure.

FIG. 1 is a block diagram outlining an overall configuration of the drive system S according to the embodiment of the present disclosure. The drive system S includes a power transmission mechanism 100 and a torque calculation apparatus 200.

The power transmission mechanism 100 may include a drive unit 10, an output unit 20, an angle detection sensor 30, and an angle detection sensor 40. The drive unit 10 may include a power source 11 such as an actuator, and a drive shaft 12 rotated by power of the power source 11. The output unit 20 may include an output shaft 222 that rotates according to rotation of the drive shaft 12. The drive shaft 12 may be rotated in positive and negative directions. Likewise, the output shaft 222 may be rotated in positive and negative directions according to the rotation of the drive shaft 12. The power transmission mechanism 100 may be used by an arm robot, for example. In that case, the output shaft 222 may be a shaft that drives an end effector.

The angle detection sensor 30 is a sensor that detects the rotation angle of the drive shaft 12. The angle detection sensor 40 detects the rotation angle of the output shaft 222. The angle detection sensors 30 and 40 may each be a tunnel magneto resistance (TMR) sensor.

The power transmission mechanism 100, interposed between the drive shaft 12 and the output shaft 222, may include a coil spring 23 as an elastic element that generates elastic force when the output shaft 222 is rotated by power from the drive unit 10. The actuator that transmits power via the interposing elastic element may be referred to as the series elastic actuator (SEA).

Here, the rotation angle of the drive shaft 12 and that of the output shaft 222 may be shifted due to external impact such as the end effector coming into contact with an obstacle. The inadvertent shift can overload the output shaft 222. The torque calculation apparatus 200 is a computer that calculates the load torque on the output shaft 222 on the basis of the values detected by the angle detection sensors 30 and 40.

The torque calculation apparatus 200 may be configured with at least one computer. The torque calculation apparatus 200 includes at least one processor, at least either a volatile memory or a nonvolatile memory, and a communication interface for either wired or wireless communication. Programs stored in the torque calculation apparatus 200 may be supplied via a network. For example, the torque calculation apparatus 200 may also include a reading part (e.g., memory card slot) for reading data from a computer-readable information storage medium, or an input/output part (e.g., USB terminal) for connection with an external device. In this case, the programs stored on the information storage medium may be supplied via the reading part or the input/output part.

In this embodiment, using an extension/contraction amount of the coil spring 23, the torque calculation apparatus 200 calculates the load torque applied on the output shaft 222 typically by external impact. The extension/contraction amount of the coil spring 23 corresponds to a difference between the rotation angle of the drive shaft 12 and that of the output shaft 222. The load torque on the output shaft 222 can be obtained by multiplying the extension/contraction amount by a spring constant of the coil spring 23.

Power Transmission Mechanism 100

Figure 2:
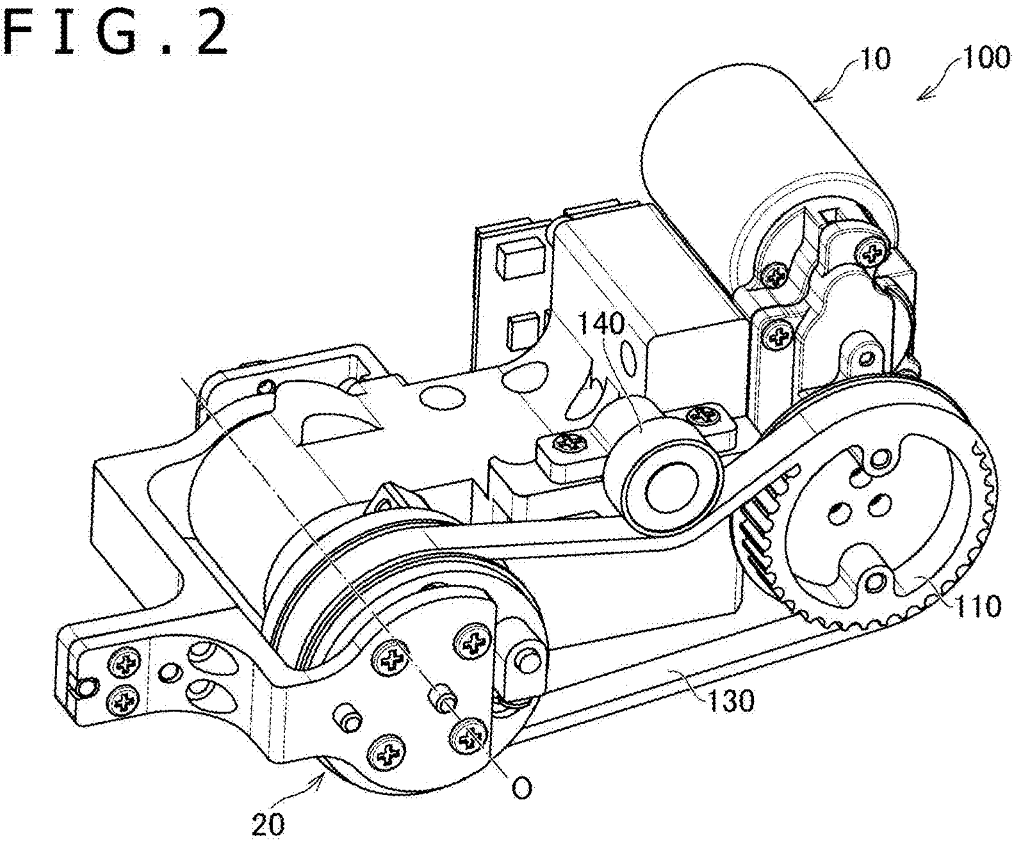
FIG. 2 is a perspective view depicting a power transmission mechanism, according to various embodiments of the present disclosure.
Figure 3:
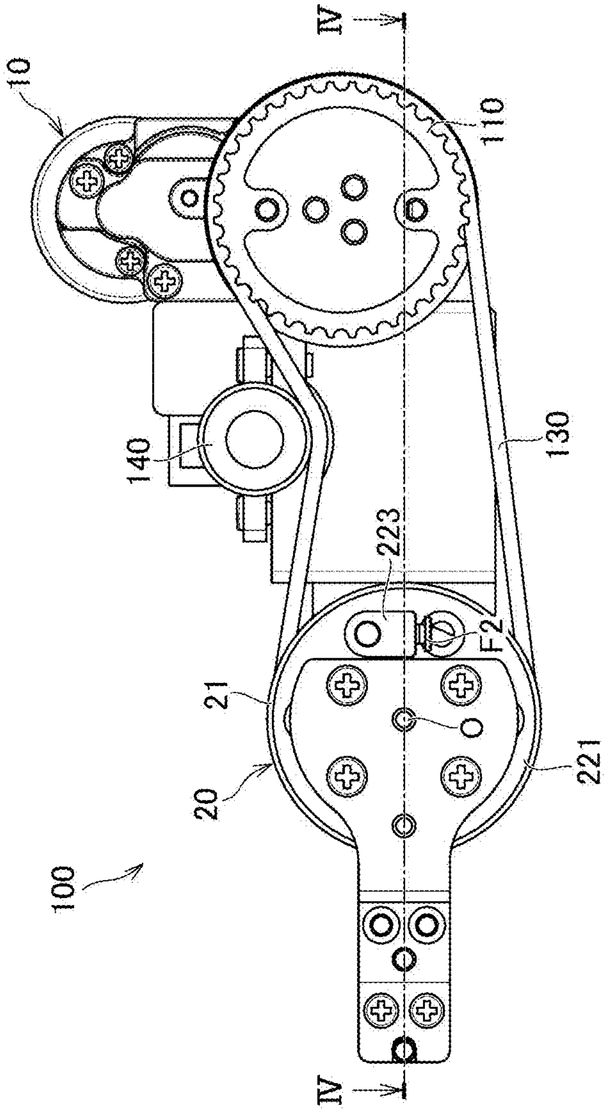
FIG. 3 is a plan view of the power transmission mechanism as viewed from a rotation axis direction, according to various embodiments of the present disclosure.
Figure 4:
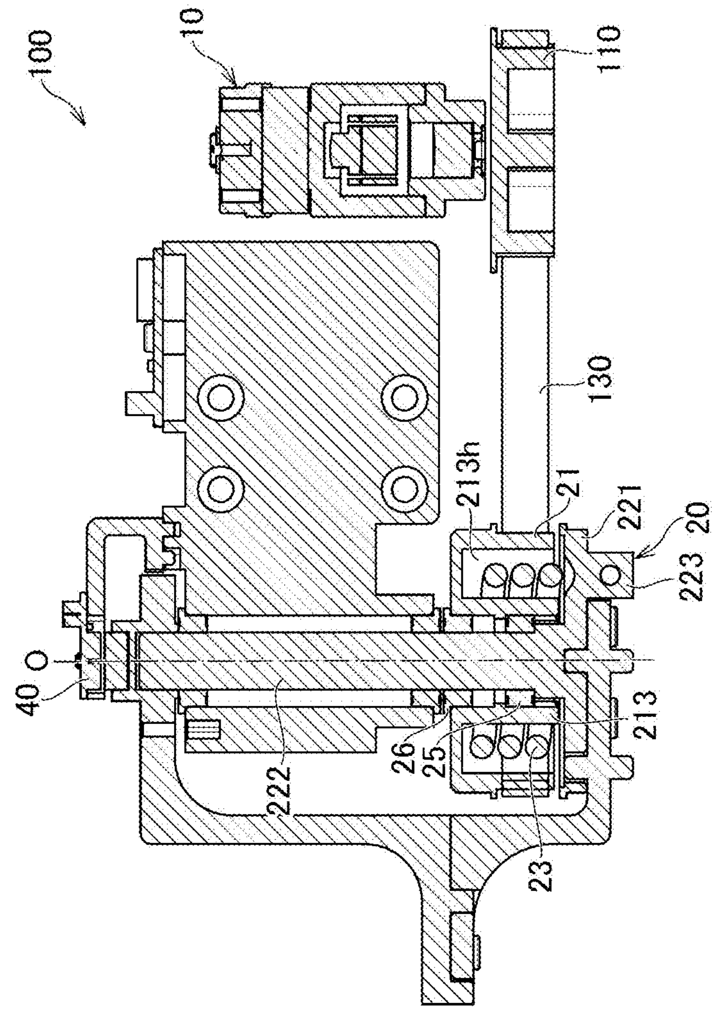
FIG. 4 is a cross-sectional view of the power transmission mechanism taken along section line IV-IV in FIG. 3, according to various embodiments of the present disclosure.

The power transmission mechanism 100 of the embodiment is explained next with reference to FIGS. 2 through 4. FIG. 2 is a perspective view depicting the power transmission mechanism 100. FIG. 3 is a plan view of the power transmission mechanism 100 as viewed from a rotation axis direction. FIG. 4 is a cross-sectional view of the power transmission mechanism 100 taken along section line IV-IV in FIG. 3.

The power transmission mechanism 100 includes a drive pulley 110, the output unit 20 that includes a driven pulley member 21, and a timing belt 130 serving as a transmission belt. For example, the drive pulley 110 may be provided in such a manner as to rotate coaxially with the rotation center of the drive shaft 12 rotated by the power from the power source 11. Whereas the power source 11 and the drive shaft 12 partially constitute the drive unit 10, they are not depicted in FIGS. 2 through 4. The driven pulley member 21 may be provided in a manner being rotated coaxially with a rotation axis O of the output shaft 222, for example.

The timing belt 130 is a circular belt that spans between the drive pulley 110 and the driven pulley member 21 to transmit the power from the drive unit 10 to the driven pulley member 21. The timing belt 130 is driven according to the rotation of the drive pulley 110 and thereby rotates the driven pulley member 21. Gears are formed on an inner peripheral surface of the timing belt 130 and on outer peripheral surfaces of the drive pulley 110 and the driven pulley member 21. These gears may be engaged with each other to move in an interlocking manner.

The power transmission mechanism 100 may further include a tensioner 140 to suppress the slack and vibrations of the timing belt 130.

Output Unit 20

Figure 5:
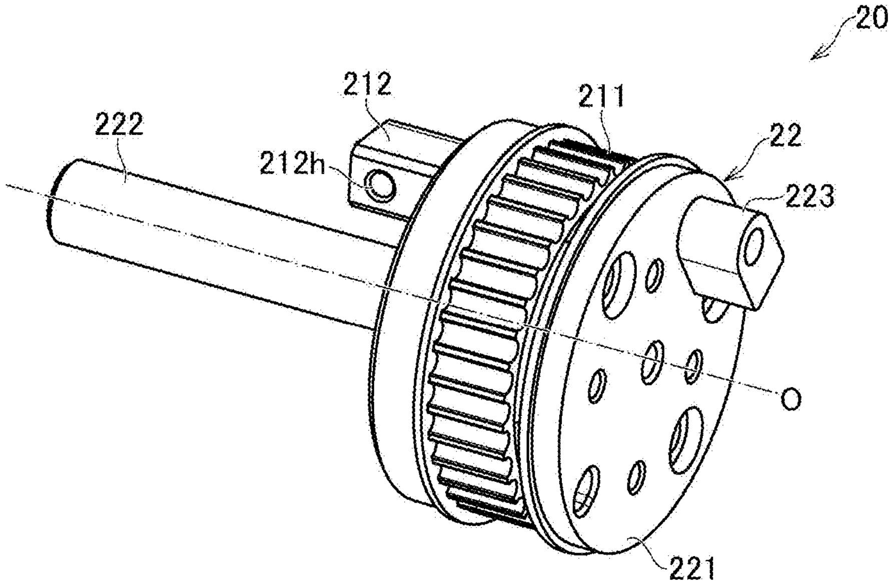
FIG. 5 is a perspective view depicting an output unit, according to various embodiments of the present disclosure.
Figure 6:
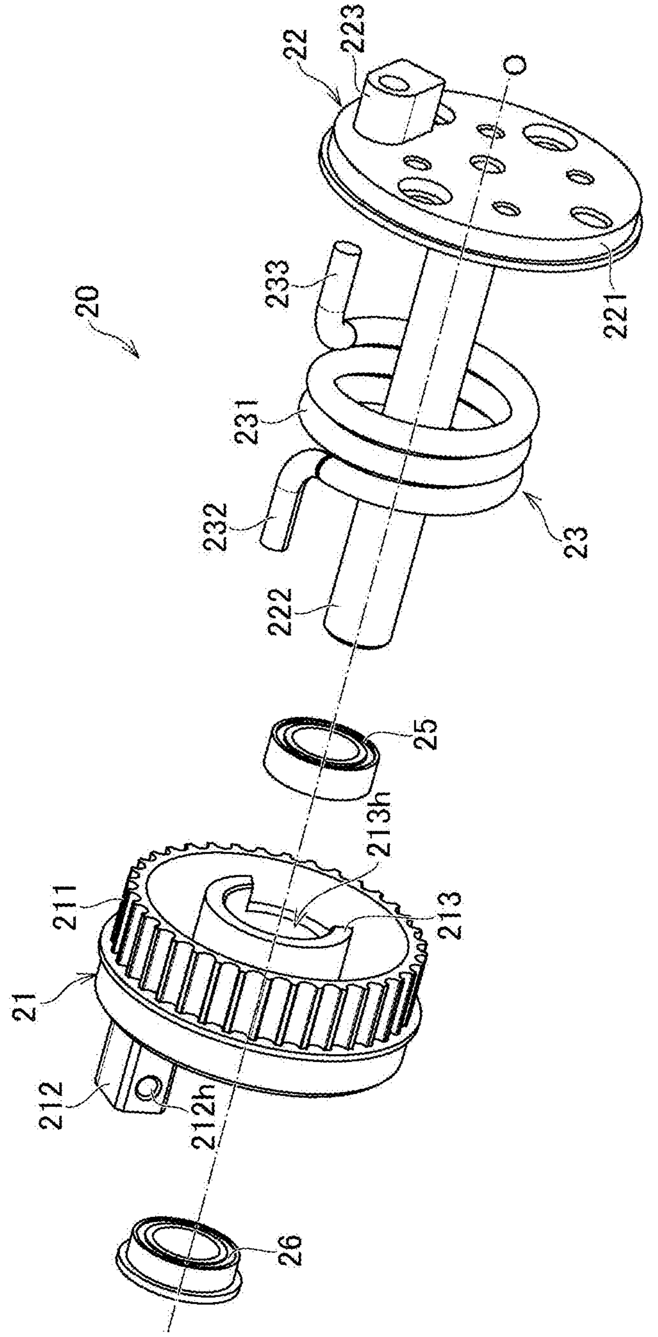
FIG. 6 is an exploded perspective view of the output unit, according to various embodiments of the present disclosure.
Figure 7:
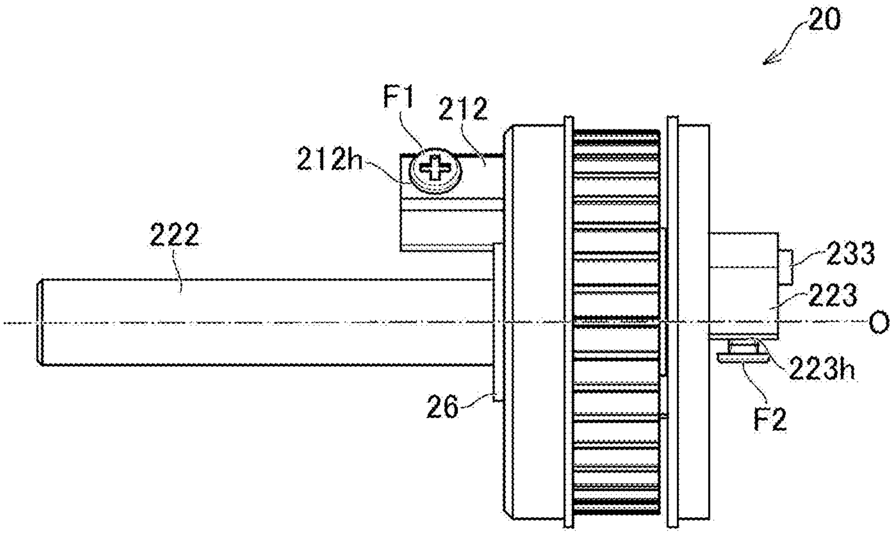
FIG. 7 is a plan view of the output unit as viewed from a direction perpendicular to a rotation axis, according to various embodiments of the present disclosure.

The configuration of the output unit 20 is explained below in detail primarily with reference to FIGS. 5 through 7. FIG. 5 is a perspective view depicting the output unit 20. FIG. 6 is an exploded perspective view of the output unit 20. FIG. 7 is a plan view of the output unit 20 as viewed from a direction perpendicular to the rotation axis.

As depicted in FIG. 6, the output unit 20 includes the above-described driven pulley member 21, an output shaft member 22 that includes the above-described output shaft 222, and the above-described coil spring 23.

The coil spring 23 may include a coil-shaped extension/contraction part 231, a power-side end part 232 disposed at one end of the extension/contraction part 231, and an output-side end part 233 disposed at the other end of the extension/contraction part 231. The coil spring 23 may be a torsion coil spring that generates torsion moment, for example.

The extension/contraction part 231 extends and contracts according to the rotation of the power-side end part 232 and the output-side end part 233, thereby generating elastic force around the rotation axis O (rotation center) of the output shaft 222.

The power-side end part 232 may be shaped to extend in the direction in which the output shaft 222 extends. The output-side end part 233 may be shaped to extend in a direction opposite to the direction in which the power-side end part 232 extends.

The driven pulley member 21 may include a gear part 211, a first housing part 212, and a bearing part 213. The gear part 211, the first housing part 212, and the bearing part 213 may be formed integrally with one another.

The gear part 211 may be shaped to be cylindrical, with gears formed on its outer peripheral surface. The first housing part 212 may be shaped to house and hold the power-side end part 232 of the coil spring 23. As indicated in FIG. 6, the first housing part 212 may be disposed on the opposite side of the gear part 211 in the driven pulley member 21 in a manner protruding therefrom. The bearing part 213 may have a center hole **213*h* through which the output shaft 222 is inserted and may be cylindrical to provide a region that houses the gear part 211 and the extension/contraction part 231 of the coil spring 23. As depicted in FIGS. 4 and 6, bearings 25 and 26 may be disposed interposingly between the bearing part 213 and the output shaft 222**.

The output shaft member 22 may include a flange part 221, the output shaft 222, and a second housing part 223. The flange part 221, the output shaft 222, and the second housing part 223 may be formed integrally with one another.

The flange part 221 may be larger in diameter than the output shaft 222 and disk-shaped to be fixed to a terminal end of the output shaft 222. The second housing part 223 may be shaped to house and hold the output-side end part 233 of the coil spring 23. The second housing part 223 may be disposed on the flange part 221 in a manner protruding to the opposite side of the output shaft 222 in the output shaft member 22.

The power-side end part 232 of the coil spring 23 may be housed in the first housing part 212 and fixed to the driven pulley member 21 using a fixture F1 such as a screw. Specifically, as depicted in FIG. 7, the power-side end part 232 may be fixed to the driven pulley member 21 with the fixture F1 inserted into a screw hole 212*h* formed on the first housing part 212, the fixture F1 holding down the outer peripheral surface of the power-side end part 232 to secure the power-side end part 232 to the driven pulley member 21. In FIG. 5, the fixture F1 is not depicted.

Likewise, the output-side end part 233 of the coil spring 23 may be housed in the second housing part 223 and fixed to the output shaft member 22 using a fixture F2 such as a screw. Specifically, as depicted in FIG. 7, the output-side end part 233 may be fixed to the output shaft member 22 with the fixture F2 inserted into a screw hole 223*h* formed on the second housing part 223, the fixture F2 holding down the outer peripheral surface of the output-side end part 233 to secure the output-side end part 233 to the output shaft member 22. The fixture F2 restricts the coil spring 23 from rotating around the output-side end part 233 as the rotation center.

When the power-side end part 232 and the output-side end part 233 of the coil spring 23 are secured as described above, these end parts are restricted from rotating in an idle manner. As a result, the power from the drive unit 10 can be transmitted stably to the output shaft 222 via the coil spring 23.

Coil Spring 23

Figure 8:
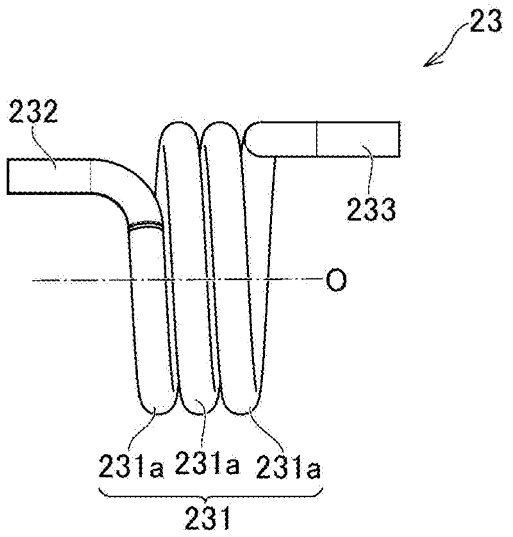
FIG. 8 is a plan view of a coil spring as viewed from a direction perpendicular to the rotation axis, according to various embodiments of the present disclosure.
Figure 9A:
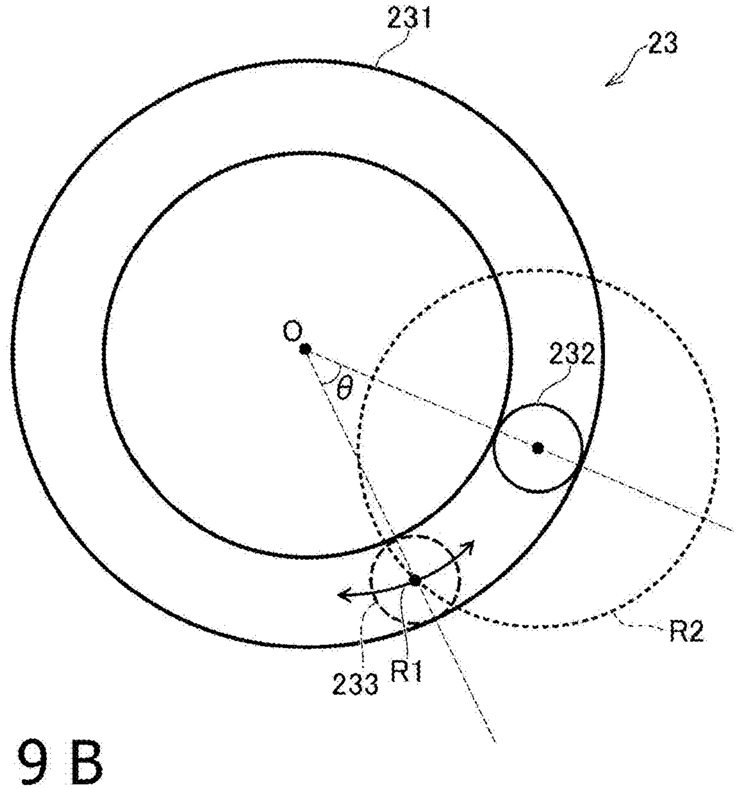
FIG. 9A is a schematic view explaining an arrangement of a power-side end part and an output-side end part, according to various embodiments of the present disclosure.
Figure 9B:
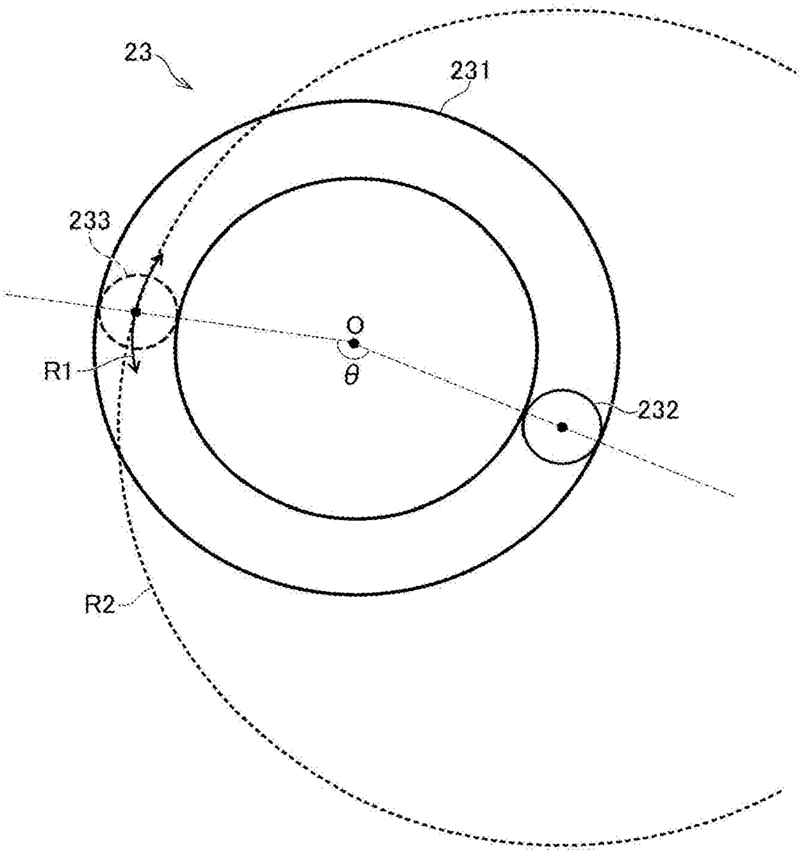
FIG. 9B is another schematic view explaining the arrangement of the power-side end part and the output-side end part, according to various embodiments of the present disclosure.

The coil spring 23 is explained further in detail with reference to FIGS. 8, 9A, and 9B. FIG. 8 is a plan view of the coil spring 23 as viewed from a direction perpendicular to the rotation axis. FIGS. 9A and 9B are schematic views explaining the arrangement of the power-side end part 232 and the output-side end part 233. FIG. 9A schematically depicts the arrangement of the power-side end part 232 and the output-side end part 233 in a state where the coil spring 23 in FIG. 8 is viewed from the direction of the rotation axis O. FIG. 9B schematically depicts another example of the coil spring 23. Also, FIGS. 9A and 9B indicate the arrangement of the power-side end part 232 and the output-side end part 233 in a state where the extension/contraction part 231 of the coil spring 23 is neither extended nor contracted.

As indicated in FIG. 8, the extension/contraction part 231 has multiple coil turns and thus includes multiple annular parts 231*a*. The multiple annular parts 231*a* may be arranged apart from one another in an extending direction of the rotation axis O (center axis line of the extension/contraction part 231). This arrangement prevents friction from occurring between the multiple annular parts 231*a* when the extension/contraction part 231 extends and contracts to generate elastic force around the rotation axis O. As a result, a linear relation between the deformation amount of the coil spring 23 and the torque applied on the output shaft 222 can be maintained. This allows the torque calculation apparatus 200 accurately to calculate the load torque on the output shaft 222. The extension/contraction part 231 may be shaped in such a manner that the multiple annular parts 231*a* stay apart from one another regardless of whether the torque is applied or not.

As depicted in FIG. 9A, an angle θ between an auxiliary line connecting the rotation axis O with the power-side end part 232 and an auxiliary line connecting the rotation axis O with the output-side end part 233 may be 90 degrees or less in the case where the coil spring 23 is viewed from the direction of the rotation axis O. More preferably, the angle θ may be 45 degrees or less.

FIGS. 9A and 9B depict examples where the end face shape of the power-side end part 232 and that of the output-side end part 233 are circular and where the auxiliary lines forming the angle θ are straight lines passing through the end face center of the power-side end part 232 and that of the output-side end part 233. Still, the auxiliary lines may be straight lines passing at least partially through the end face of the power-side end part 232 and that of the output-side end part 233.

In the case where, as indicated in FIG. 9B, the angle θ between the auxiliary line connecting the rotation axis O with the power-side end part 232 and the auxiliary line connecting the rotation axis O with the output-side end part 233 is larger than 90 degrees, the entire coil spring 23 rotates around the power-side end part 232. This raises a fear that rotational force may not be transmitted effectively to the output shaft 222. In FIGS. 9A and 9B, a reference sign R1 indicates the direction of the rotational torque applied on the output-side end part 233 in the case where rotational force is normally transmitted, and a reference sign R2 indicates the direction of the rotational torque in the case where the entire coil spring 23 is rotated.

In the arrangement of FIG. 9B, the directions R1 and R2 coincide substantially with each other. In this configuration, in the case where the rotational torque applied on the output-side end part 233 by a large amount of rotational force exerted on the power-side end part 232 exceeds the fixing torque applied on the output-side end part 233 by the fixture F2, the power-side end part 232 rotates idly in the direction R2 around the output-side end part 233. That is, the coil spring 23 rotates in an idle manner without the output-side end part 233 changing its position. By contrast, in the arrangement of FIG. 9A, the directions R1 and R2 differ from each other. This allows the output-side end part 233 to rotate in the direction R1 without the coil spring 23 rotating idly even when a large amount of rotational force is applied on the power-side end part 232.

In the case where the arrangement of FIG. 9B is to be adopted, the output-side end part 233 may be fixed securely to the output shaft member 22 such that the coil spring 23 will not rotate idly around the output-side end part 233.

Conclusion

The above-described embodiment is simply configured by use of the coil spring 23, which permits calculation of the load torque on the output shaft 222. The coil spring 23 interposed between the drive shaft 12 and the output shaft 222 absorbs impact that may be applied externally to the output shaft 222. This improves the durability of the power transmission mechanism 100. The simple configuration makes it possible to assemble the output unit 20 with ease. Also, the coil spring 23 is inexpensive, which reduces the cost of manufacturing the power transmission mechanism 100.

Furthermore, the linear characteristic of the spring constant of the coil spring 23 permits accurate calculation of the load torque on the output shaft 222 rotating in both positive and negative directions.

The elastic member interposed between the drive shaft 12 and the output shaft 222 is not limited to the coil spring 23. Alternatively, the elastic member may be a member including an extension/contraction part that extends and contracts in a manner generating elastic force around the rotation center according to a rotation angle misalignment between the drive shaft 12 and the output shaft 222.

Supplementary Note

For example, the power transmission mechanism 100 may also be configured as follows.

(1)

A power transmission mechanism including:

a drive unit that includes a power source; and an output unit driven by power from the power source, in which the output unit includes an output shaft, and an elastic member including a power-side end part that rotates according to the power from the power source, an output-side end part that rotates in keeping with rotation of the power-side end part so as to rotate the output shaft, and an extension/contraction part that generates elastic force around a rotation center of the power-side end part and the output-side end part.

(2)

The power transmission mechanism according to (1), in which the extension/contraction part has a coil shape including a plurality of annular parts, and the annular parts are arranged apart from one another in a direction of a rotation center axis of the elastic member.

(3)

The power transmission mechanism according to (1) or (2), in which the extension/contraction part has a coil shape, and an angle between an auxiliary line connecting a center axis line of the extension/contraction part with the power-side end part and an auxiliary line connecting the center axis line with the output-side end part is 90 degrees or less, as viewed from a direction in which the center axis line extends.

(4)

The power transmission mechanism according to any one of (1) to (3), in which the elastic member is a torsion coil spring.

(5)

The power transmission mechanism according to any one of (1) to (4), in which the drive unit includes a drive pulley, the output unit includes a driven pulley member, and a flange part formed integrally with the output shaft, the power transmission mechanism further includes a timing belt provided to span between the drive pulley and the driven pulley members, the power-side end part is held by the driven pulley member, and the output-side end part is held by the flange part.

(6)

The power transmission mechanism according to (5), in which the driven pulley member includes a first housing part that houses the power-side end part, the flange part includes a second housing part that houses the output-side end part, and a fixture is provided to fix the output-side end part housed in the second housing part, so as to restrict the elastic member from rotating around the output-side end part.

It should be understood by those skilled in the art that various modifications, combinations, sub-combinations and alterations may occur depending on design requirements and other factors insofar as they are within the scope of the appended claims or the equivalents thereof.

What is claimed is:

1. A power transmission mechanism comprising:

a drive unit, the drive unit comprising:

a power source; and a drive pulley; and an output unit driven by power from the power source, the output unit comprising:

a driven pulley member;

an output shaft;

a flange part formed integrally with the output shaft; and an elastic member, the elastic member comprising:

a power-side end part that rotates according to the power from the power source;

an output-side end part that rotates in keeping with rotation of the power-side end part so as to rotate the output shaft; and an extension/contraction part that generates elastic force around a rotation center of the power-side end part and the output-side end part; and a transmission belt provided to span between the drive pulley and the driven pulley member, wherein the power-side end part is held by the driven pulley member and the output-side end part is held by the flange part.

2. The power transmission mechanism according to claim 1, wherein the extension/contraction part has a coil shape including a plurality of annular parts, and the annular parts are arranged apart from one another in a direction in which a center axis line of the extension/contraction part extends.

3. The power transmission mechanism according to claim 2, wherein the plurality of annular parts stay apart from one another regardless of whether torque is applied to the output shaft.

4. The power transmission mechanism according to claim 1, wherein the extension/contraction part has a coil shape, and an angle between an auxiliary line connecting a center axis line of the extension/contraction part with the power-side end part and an auxiliary line connecting the center axis line with the output-side end part is 90 degrees or less, as viewed from a direction in which the center axis line extends.

5. The power transmission mechanism according to claim 4, wherein the angle is 45 degrees or less.

6. The power transmission mechanism according to claim 1, wherein the elastic member is a torsion coil spring.

7. The power transmission mechanism according to claim 1, wherein the driven pulley member comprises a first housing part that houses the power-side end part, the flange part comprises a second housing part that houses the output-side end part, and a fixture is provided to fix the output-side end part housed in the second housing part so as to restrict the elastic member from rotating around the output-side end part.

8. The power transmission mechanism according to claim 1, wherein the transmission belt is a timing belt.

9. The power transmission mechanism according to claim 8, wherein gears are formed on an inner peripheral surface of the timing belt and on outer peripheral surfaces of the drive pulley and the driven pulley member.

10. The power transmission mechanism according to claim 8, further comprising a tensioner configured to suppress slack and vibrations of the timing belt.

11. The power transmission mechanism according to claim 1, wherein the driven pulley member further comprises a cylindrical bearing part having a center hole through which the output shaft is inserted.

12. The power transmission mechanism according to claim 11, further comprising bearings disposed interposingly between the bearing part and the output shaft.

13. The power transmission mechanism according to claim 1, wherein the flange part is larger in diameter than the output shaft and disk-shaped to be fixed to a terminal end of the output shaft.

14. The power transmission mechanism according to claim 1, wherein the power transmission mechanism is configured for use in an arm robot, and the output shaft is configured to drive an end effector.

15. A drive system comprising:
- a power transmission mechanism comprising:
  - a drive unit, the drive unit comprising:
    - a power source; and
    - a drive pulley; and
  - an output unit driven by power from the power source, the output unit comprising:
    - a driven pulley member;
    - an output shaft;
    - a flange part formed integrally with the output shaft; and
    - an elastic member, the elastic member comprising:
      - a power-side end part that rotates according to the power from the power source;
      - an output-side end part that rotates in keeping with the rotation of the power-side end part so as to rotate the output shaft; and
      - an extension/contraction part that generates elastic force around a rotation center of the power-side end part and the output-side end part; and
  - a transmission belt provided to span between the drive pulley and the driven pulley member, wherein the power-side end part is held by the driven pulley member and the output-side end part is held by the flange part; and
  - a torque calculation apparatus configured to calculate load torque on the output shaft on a basis of an extension/contraction amount of the elastic member according to a rotation angle of a drive shaft possessed by the drive unit and a rotation angle of the output shaft.

16. The drive system according to claim 15, wherein the torque calculation apparatus calculates the load torque on the output shaft by multiplying the extension/contraction amount by a spring constant of the elastic member.

17. The drive system according to claim 15, further comprising a first angle detection sensor configured to detect the rotation angle of the drive shaft and a second angle detection sensor configured to detect the rotation angle of the output shaft.

18. The drive system according to claim 17, wherein each of the first angle detection sensor and the second angle detection sensor is a tunnel magneto resistance (TMR) sensor.

19. An output unit driven by power from a power source, comprising:
- a driven pulley member;
- an output shaft; and
- a flange part formed integrally with the output shaft;
- an elastic member, the elastic member comprising:
  - a power-side end part that rotates according to the power from the power source;
  - an output-side end part that rotates in keeping with rotation of the power-side end part so as to rotate the output shaft; and
  - an extension/contraction part that generates elastic force around a rotation center of the power-side end part and the output-side end part,
  - wherein the driven pulley member comprises a first housing part that houses the power-side end part, the flange part comprises a second housing part that houses the output-side end part, and a fixture is provided to fix the output-side end part housed in the second housing part so as to restrict the elastic member from rotating around the output-side end part.

20. The output unit according to claim 19, wherein the fixture is a screw inserted into a screw hole formed on the second housing part.

* * * * *